(No Model.) 4 Sheets—Sheet 2.

G. E. DOW.
PUMP.

No. 419,248. Patented Jan. 14, 1890.

Witnesses,
Geo. H. Strong

Inventor,
George E. Dow
By Dewey & Co.
Atty (No Model.) 4 Sheets—Sheet 3.

G. E. DOW.
PUMP.

No. 419,248. Patented Jan. 14, 1890.

Witnesses,
Geo. H. Strong
J. H. Nourse

Inventor
George E. Dow
By Dewey & Co.
attys (No Model.) 4 Sheets—Sheet 4.
G. E. DOW.
PUMP.
No. 419,248. Patented Jan. 14, 1890.
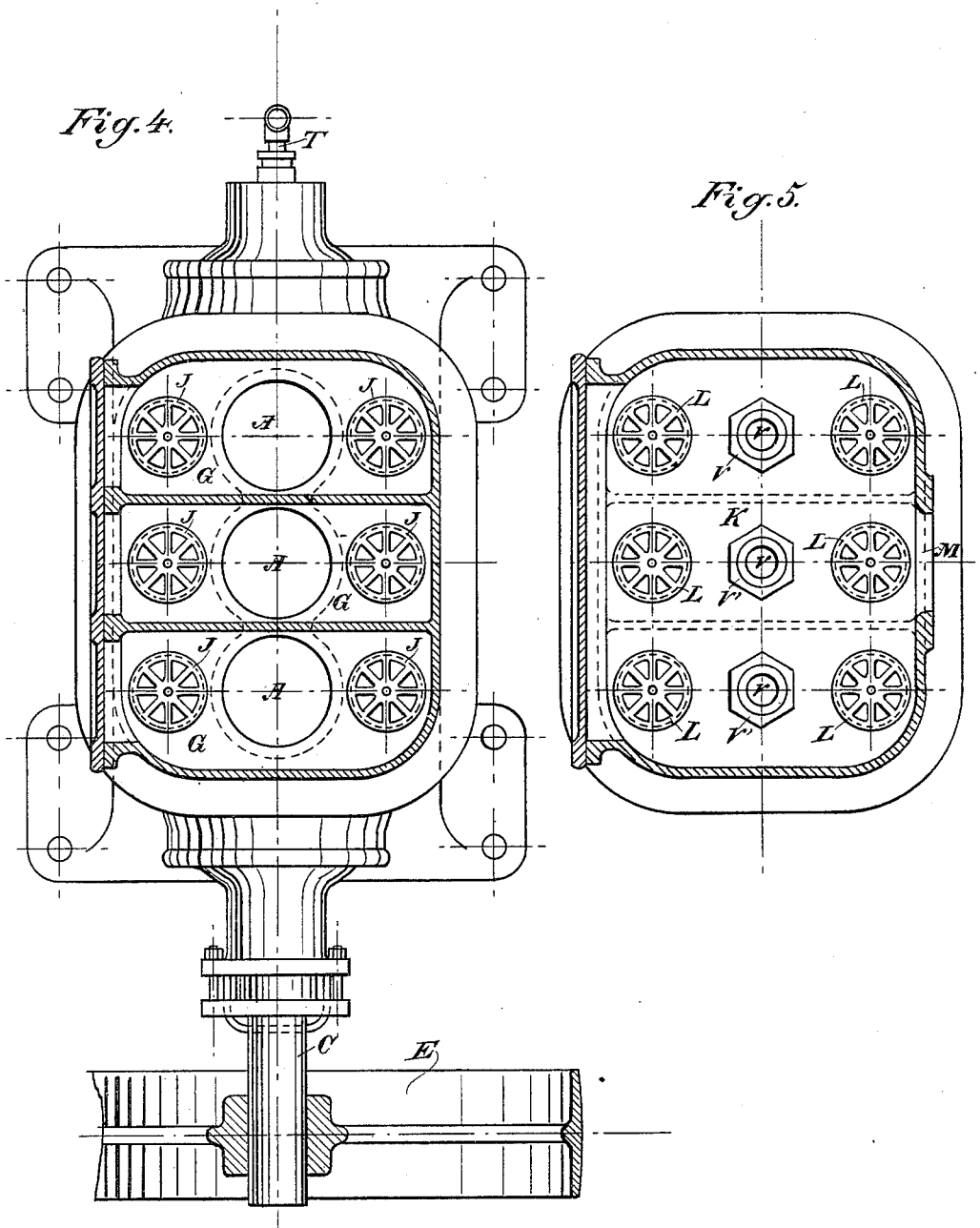
Witnesses;
Geo. H. Strong.
Inventor,
George E. Dow
By Dewey & Co.
Attys

UNITED STATES PATENT OFFICE.

GEORGE E. DOW, OF SAN FRANCISCO, CALIFORNIA.

PUMP.

SPECIFICATION forming part of Letters Patent No. 419,248, dated January 14, 1890.

Application filed June 6, 1889. Serial No. 313,366. (No model.)

*To all whom it may concern:*

Be it known that I, GEORGE E. DOW, of the city and county of San Francisco, State of California, have invented an Improvement in Multiplex Plunger-Pumps; and I hereby declare the following to be a full, clear, and exact description of the same.

My invention relates to an improved pump; and it consists in the constructions and combinations of devices which I shall hereinafter fully describe and claim.

Figure 1:
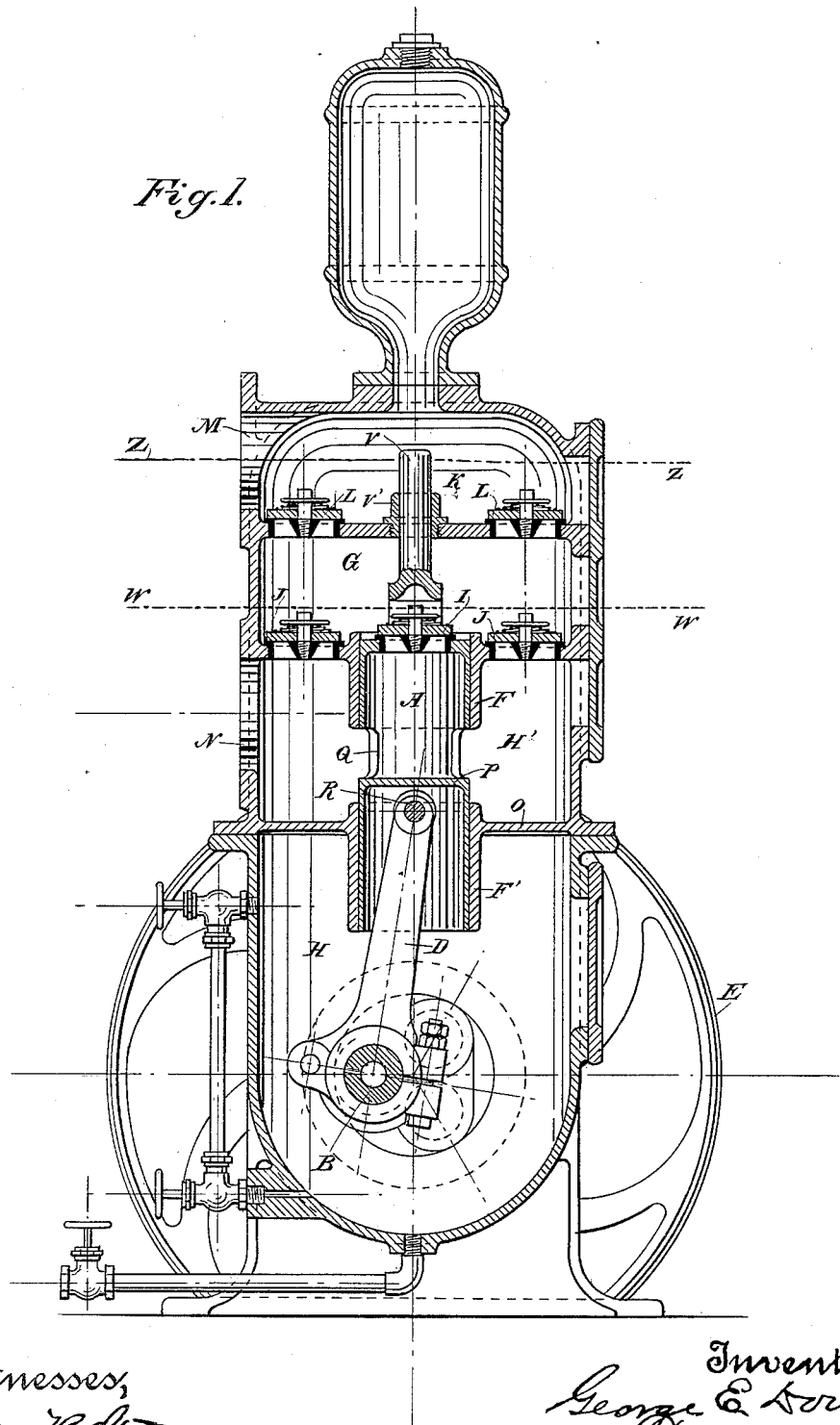
Figure 2:
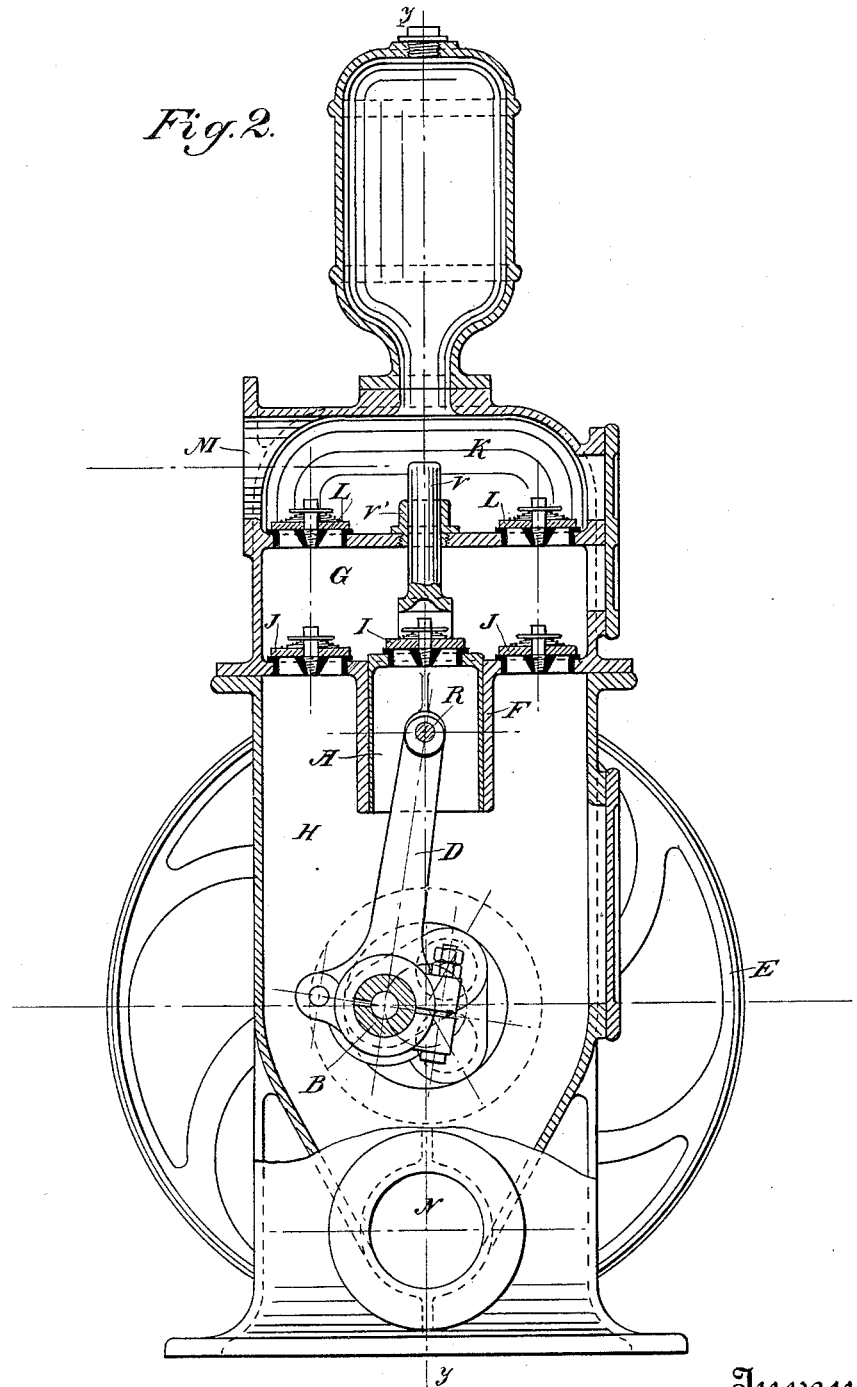
Figure 3:
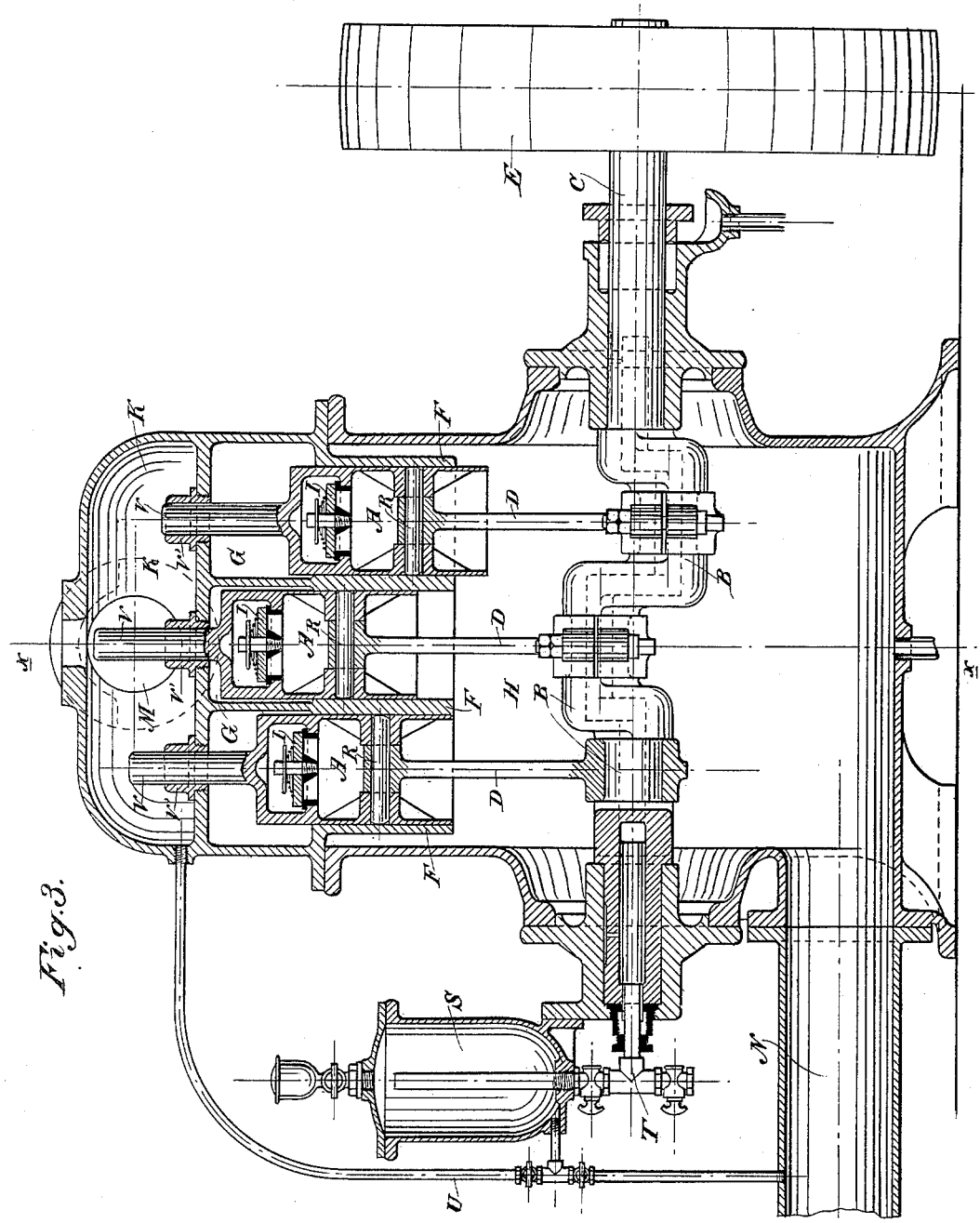

Referring to the accompanying drawings for a more complete explanation of my invention, Figure 1 is a vertical section taken through the axis of one of the plungers and showing a diaphragm between the suction and crank chambers. Fig. 2 is a similar section taken through the line $x$ $x$ of Fig. 3, showing the suction and crank chambers in one. Fig. 3 is a longitudinal vertical section taken through $y$ $y$ of Fig. 2. Fig. 4 is a horizontal section taken through $w$ $w$ of Fig. 1. Fig. 5 is a horizontal section taken through $z$ $z$ of Fig. 1.

This device consists, mainly, in a series of single-acting plungers A, preferably constructed so as to operate vertically, and they are not less than three in number, so as to maintain an even balance and pressure. These plungers are driven from cranks B upon the crank-shaft C, which is journaled in the lower part of the containing-case, this case inclosing all the operating parts of the pump. The cranks are set at equal distances apart upon the circle which represents their throw, and have a uniform throw or stroke. The plungers are connected with the cranks by connecting-rods D, and by means of a pulley E upon the end of the shaft or other well-known medium power is transmitted to drive it, and through it the plungers. The plungers A are in the form of hollow cylindrical shells accurately fitted in casings or sleeves F, within which they reciprocate. These sleeves project from the bottom of the valve-chamber G into the lower part of the case H, which contains and incloses the cranks and connecting-rods.

In the upper part of each hollow piston is fitted an inlet-valve I, opening upwardly into the independent chamber G, and upon each side of the plungers are similar valves J, opening upwardly from the casing H into the valve-chambers G. Above the chambers G is a discharge-chamber K, having the delivery-valves L, through which the water is delivered from the chambers G into the chamber K, and from this chamber it passes out through the discharge opening or pipe at M.

In Figs. 2 and 3 I have shown the inlet or supply pipe N, opening directly into the lower part of the casing H, in which the cranks are contained. This construction will serve very well in pumping clear water and for use in connection with hydraulic elevators and under other similar conditions.

The reciprocation of the hollow plungers A forms a vacuum in the chambers G, and the valves I and J will open, admitting water from the chamber H through these valves into the chambers G, and from these it is forced through the valves L into the discharge-chamber K. In cases where the water is dirty or acidulous or is otherwise unfitted to come in contact with the cranks and working parts the chamber H is divided by a horizontal diaphragm or partition O, as shown in Fig. 1, into two parts H and H'. The inlet-opening N connects with the upper chamber H', from which the valves I and J deliver into the chambers G, as above described. In this case the plungers A are made longer and the lower portion of each passes through a sleeve F' in the diaphragm O, corresponding with the sleeve F at the bottom of the valve-chamber, and a partition or diaphragm P cuts off the lower part of the piston or plunger from the upper part. In this case openings are made in the sides of the upper part of the plunger A, as shown at Q, to admit water from the chamber H' into the piston, and thence to the valve I. The connecting-rods D have their upper ends united with the hollow lower ends of the plungers A by wrist-pins, as shown at R.

In order to lubricate the bearings of the crank-shaft, I have made the shaft hollow, with a passage extending through it and with small holes opening from this passage into the journal-bearings of the shaft. A cup S, containing a lubricant, is connected by a pipe T with the end of the crank-shaft, this pipe passing through a stuffing-box which is fitted to the end of the journal-box, and so as to allow the crank-shaft to revolve, while proper connection is kept up. Pressure to force the lubricant from the cup S is derived from the discharge-chamber of the pump through a pipe U. The cranks and connecting-rod journals may be lubricated in a similar manner, or by means of the water itself when the latter passes through the casing of the cranks on its way to the pump-chamber.

As this pump is designed for a large range of duty, it is necessary to prevent jar and pounding when run at a high rate of speed. This I effect by maintaining a constant downward pressure against the crank and wrist-pin journals by means of the extensions V from the plungers A passing up through closely-fitted sleeves V' into the upper or discharge chamber. The area of these extensions is such that the pressure exerted upon them by the water in the upper or discharge chamber K is sufficient to maintain a constant downward bearing upon the wrist-pins and crank-journals, and the plungers may thus be run at a very high rate of speed without pounding or jar, and the wear on all journals is self-adjusting.

The number of plungers operating in connection with one suction-chamber and one discharge-chamber, with separate valve-chambers intermediate between the two and each having valves operated by its own piston, insures a steady flow and a steady and constant resistance to the rotation of the shaft, and enables me to obtain a large range of rotative speed.

Having thus described my invention, what I claim as new, and desire to secure by Letters Patent, is—

1. In a pump, a closed case the lower part of which forms a casing for the cranks and a suction-chamber and the upper part a discharge-chamber, with intermediate and independent valve-chambers between the two, in combination with the hollow vertically-reciprocating plungers connected with the cranks and reciprocating in sleeves between the valve-chambers and the suction-chamber, said plungers having valves through which water is admitted into the valve-chambers, substantially as described.

2. The suction and discharge chambers, with the intermediate and separate valve-chambers and three or more plungers, corresponding in number to the independent valve-chambers, cranks and connecting-rods whereby said plungers are reciprocated, and valves admitting water from a common suction-chamber into the independent valve-chambers and discharging it thence into the common discharge-chamber, said plungers having extensions projecting into the discharge-chamber, whereby pressure is applied to maintain the constant downward pressure and contact between the crank and the wrist-pins of the connecting-rod, substantially as described.

3. A pump consisting of an exterior casing subdivided by partitions into a suction and crank chamber, a discharge-chamber, intermediate and independent valve-chambers with induction and discharge valves, single-acting plungers reciprocating between the suction and each of the valve chambers, a hollow crank-shaft and cranks connected with the plungers, an oil-reservoir with a pipe leading from it into the end of the crank-shaft, and a pipe connecting it with the discharge-chamber, substantially as described.

In witness whereof I have hereunto set my hand.

GEORGE E. DOW.

Witnesses:
S. H. NOURSE,
H. C. LEE.